(12) United States Patent
Lee et al.

(10) Patent No.: US 11,961,441 B2
(45) Date of Patent: Apr. 16, 2024

(54) DISPLAY DEVICE

(71) Applicant: Samsung Display Co., LTD., Yongin-si (KR)

(72) Inventors: Joo Hyung Lee, Yongin-si (KR); Chun Sik Byun, Yongin-si (KR); Ho Seok Han, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 17/970,708

(22) Filed: Oct. 21, 2022

(65) Prior Publication Data

US 2023/0186811 A1 Jun. 15, 2023

(30) Foreign Application Priority Data

Dec. 9, 2021 (KR) .......................... 10-2021-0176050

(51) Int. Cl.
*G09G 3/20* (2006.01)
*G06F 1/16* (2006.01)
*G09G 3/00* (2006.01)

(52) U.S. Cl.
CPC .............. *G09G 3/20* (2013.01); *G09G 3/035* (2020.08); *G09G 3/2007* (2013.01); *G06F 1/1652* (2013.01); *G09G 2310/08* (2013.01); *G09G 2330/021* (2013.01); *G09G 2340/04* (2013.01); *G09G 2360/16* (2013.01)

(58) Field of Classification Search
CPC ........ G09G 3/20; G09G 3/035; G09G 3/2007; G09G 2310/08; G09G 2330/021; G09G 2340/04; G09G 2360/16; G06F 1/1652

USPC ......................................................... 345/698
See application file for complete search history.

(56) References Cited

U.S. PATENT DOCUMENTS

| 9,870,029 | B2 | 1/2018 | Kim et al. | |
|---|---|---|---|---|
| 2005/0052340 | A1* | 3/2005 | Goto | G09G 3/3611 345/1.3 |
| 2015/0015551 | A1* | 1/2015 | Honda | G09G 3/2096 345/204 |
| 2018/0068612 | A1* | 3/2018 | Cho | G09G 3/20 |
| 2018/0107306 | A1* | 4/2018 | Hong | G06F 1/1652 |

(Continued)

FOREIGN PATENT DOCUMENTS

| KR | 101649097 | 8/2016 |
|---|---|---|
| KR | 1020200111519 | 9/2020 |

(Continued)

*Primary Examiner* — Amare Mengistu
*Assistant Examiner* — Gloryvid Figueroa-Gibson
(74) *Attorney, Agent, or Firm* — CANTOR COLBURN LLP

(57) ABSTRACT

A display device includes a display panel having flexibility, a storage connected to a first end of the display panel and accommodating the display panel so that the display panel is inserted and withdrawn, an extension part connected to a second end of the display panel, which is opposite to the first end of the display panel, and facing one side of the storage in a first direction, and a display driving integrated circuit which receives image data and a control signal from a host and provides a data signal to the display panel.
The display driving integrated circuit includes a data processor which receives a smart size change signal from the host and sets a non-active area of the display panel based on the smart size change signal.

16 Claims, 13 Drawing Sheets

(56) References Cited

U.S. PATENT DOCUMENTS

| | | | | |
|---|---|---|---|---|
| 2018/0284964 A1* | 10/2018 | Kang | ................. | H04M 1/0268 |
| 2020/0312253 A1 | 10/2020 | Kim | | |
| 2020/0357362 A1* | 11/2020 | Shin | ...................... | G09G 3/035 |
| 2021/0020087 A1* | 1/2021 | Kim | ....................... | G09G 3/035 |
| 2022/0005392 A1 | 1/2022 | Lee et al. | | |

FOREIGN PATENT DOCUMENTS

| | | |
|---|---|---|
| KR | 1020200115830 | 10/2020 |
| KR | 1020210072584 | 6/2021 |
| KR | 1020210077340 | 6/2021 |

* cited by examiner

FIG. 9

| S2Cp | S2Cn | Non-active Area Size |
|---|---|---|
| 0 | 0 | 0 pixel |
| 0 | H | 100 pixels |
| 0 | HH | 200 pixels |
| 0 | L | 300 pixels |
| 0 | LL | 400 pixels |
| H | 0 | 500 pixels |
| H | H | 600 pixels |
| H | HH | 700 pixels |
| H | L | 800 pixels |
| H | LL | 900 pixels |
| HH | 0 | 1000 pixels |
| HH | H | 1100 pixels |
| HH | HH | 1200 pixels |
| HH | L | 1300 pixels |
| HH | LL | 1400 pixels |
| L | 0 | 1500 pixels |
| L | H | 1600 pixels |
| L | HH | 1700 pixels |
| L | L | 1800 pixels |
| L | LL | 1900 pixels |
| LL | 0 | 2000 pixels |
| LL | H | 2100 pixels |
| LL | HH | 2200 pixels |
| LL | L | 2300 pixels |
| LL | LL | 2400 pixels |

<LUT>

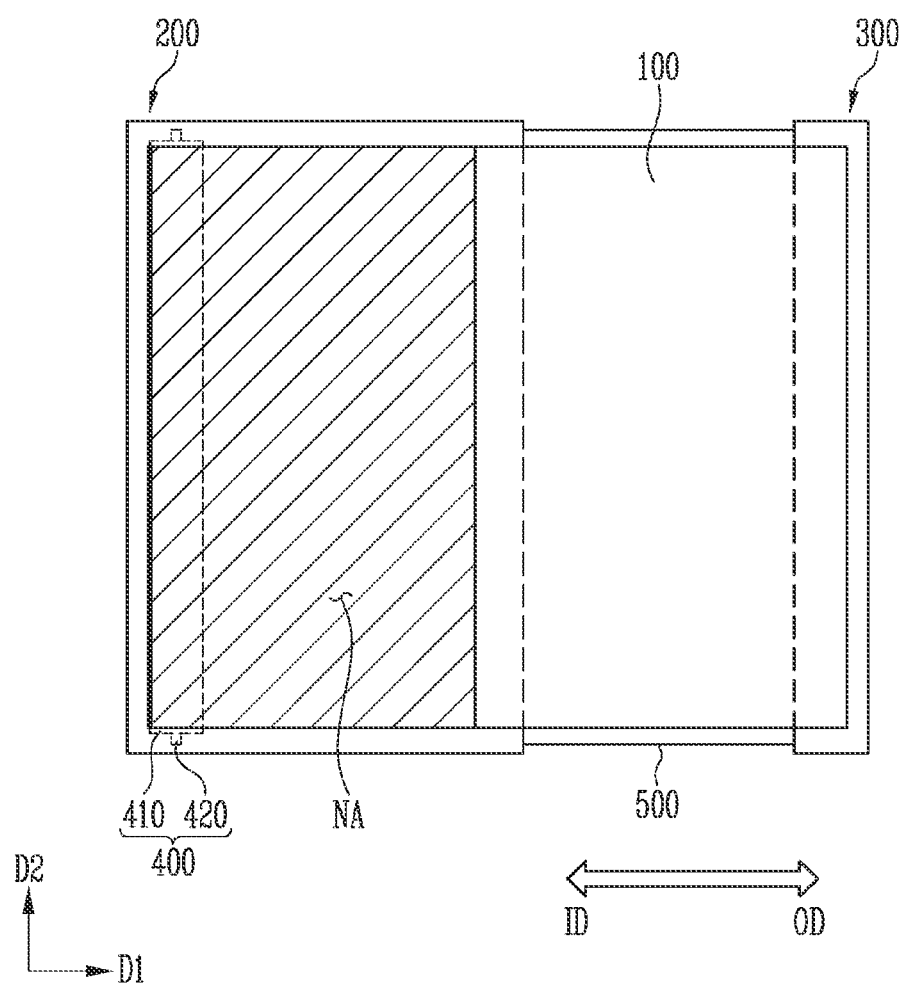

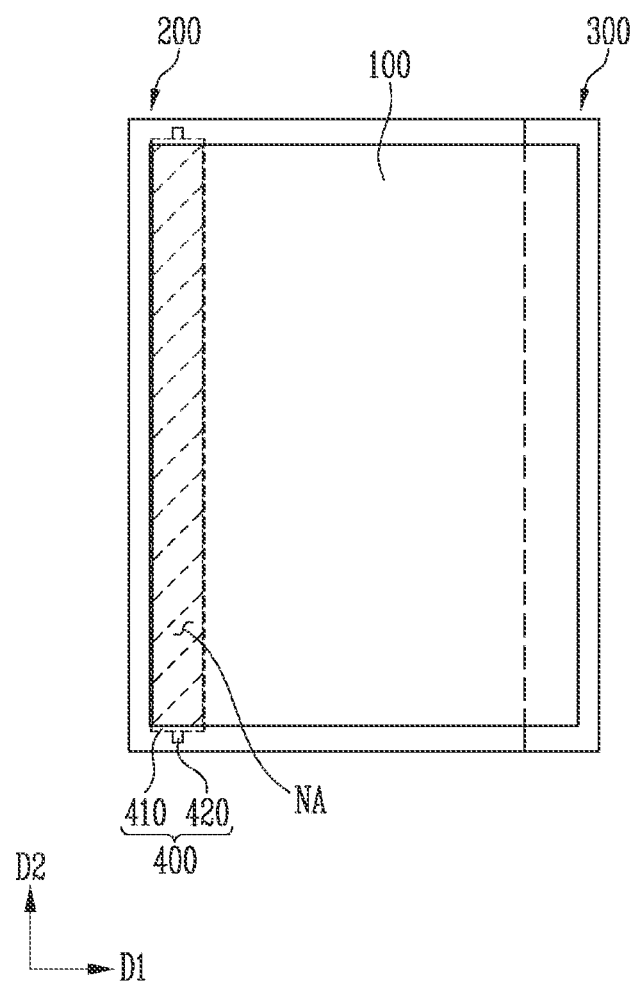

DISPLAY DEVICE

This application claims priority to Korean Patent Application No. 10-2021-0176050, filed on Dec. 9, 2021, and all the benefits accruing therefrom under 35 U.S.C. § 119, the content of which in its entirety is herein incorporated by reference.

BACKGROUND

1. Field

Embodiments of the invention relate to a display device.

2. Description of the Related Art

A flexible display device may be implemented as a rollable display device capable of winding a display panel with a predetermined radius of curvature.

Rollable display devices are being actively studied due to a wide display area and excellent portability.

SUMMARY

When a rollable display device winds a display panel on a roller (or rotating barrel) inside a housing (or storage), power consumption may be wasted because an image is displayed even on the display panel that is wound on the roller and is not visually recognized by a user.

A technical problem to be solved by the invention is to provide a rollable display device with reduced power consumption.

In order to solve the above technical problem, a display device in an embodiment of the invention includes a display panel having flexibility, a storage connected to a first end of the display panel and accommodating the display panel so that the display panel is inserted and withdrawn, an extension part connected to a second end of the display panel, which is opposite to the first end of the display panel, and facing a side of the storage in a first direction, and a display driving integrated circuit which receives image data and a control signal from a host and provides a data signal to the display panel.

In an embodiment, the display driving integrated circuit may include a data processor receiving a smart size change signal from the host and setting a non-active area of the display panel based on the smart size change signal.

In an embodiment, a size of the non-active area may increase in proportion to a degree to which the display panel is inserted into the storage.

In an embodiment, the display driving integrated circuit may receive the image data and the control signal from the host through a first interface.

In an embodiment, the first interface may be a mobile industry processor interface ("MIPI") method.

In an embodiment, the display driving integrated circuit may receive the smart size change signal through a second interface different from the first interface.

In an embodiment, the second interface may include at least one connection line.

In an embodiment, the smart size change signal may be a pulse waveform including a plurality of levels.

In an embodiment, the smart size change signal may include a 0 level, an H level, an HH level, an L level, and an LL level, and the smart size change signal may have a higher voltage level in an order of the LL level, the L level, the 0 level, the H level, and the HH level.

In an embodiment, the display driving integrated circuit may include a memory in which a lookup table including a size of the non-active area corresponding to the smart size change signal is stored.

In an embodiment, the display driving integrated circuit may include a channel unit providing the data signal corresponding to a black grayscale to pixels disposed in the non-active area.

In an embodiment, the storage and the extension part may extend in a second direction intersecting the first direction.

In an embodiment, the storage may further include a roller on which the display panel is wound in a predetermined rotation direction.

In an embodiment, the roller may include a rotating barrel having a cylindrical shape extending in the second direction and having the display panel wound around an outer surface thereof, and a rotating shaft extending through the rotating barrel in the second direction and having opposite ends fixed to an inner surface of the storage in the second direction, and the rotating barrel may rotate in the predetermined rotation direction about the rotating shaft.

In an embodiment, the smart size change signal may include information on a winding amount related to a degree to which the display panel is wound on the roller.

In an embodiment, the non-active area may increase as the winding amount increases.

In order to solve the above technical problem, a display device in an embodiment of the invention includes a host which transmits image data and a control signal through a first interface and transmitting a smart size change signal through a second interface different from the first interface, a display driving integrated circuit including a first interface unit which receives the image data and the control signal through the first interface, and a second interface unit which receives the smart size change signal through the second interface, and a display panel which receives the image data, the control signal, and a data signal corresponding to the smart size change signal from the display driving integrated circuit to display an image.

In an embodiment, the display driving integrated circuit may include a data processor setting a non-active area of the display panel based on the smart size change signal.

In an embodiment, the first interface may be an MIPI method.

In an embodiment, the second interface unit may include at least one connection line.

In an embodiment, the smart size change signal may be a pulse waveform including a plurality of levels.

In an embodiment, the display driving integrated circuit may include a memory in which a lookup table including a size of the non-active area corresponding to the smart size change signal is stored.

In an embodiment, the display driving integrated circuit may include a channel unit providing the data signal corresponding to a black grayscale to pixels disposed in the non-active area.

BRIEF DESCRIPTION OF THE DRAWINGS

The accompanying drawings, which are included to provide a further understanding of the invention, and are incorporated in and constitute a part of this specification, illustrate embodiments of the invention, and, together with the description, serve to explain principles of the invention.

FIG. 9 is a lookup table including sizes of non-active areas corresponding to smart change signals transmitted to each of third interconnect lines.

FIGS. 10A to 10C are plan views illustrating a process of changing a screen size of a display panel from a maximum screen size to a minimum screen size.

DETAILED DESCRIPTION

Figure 1:
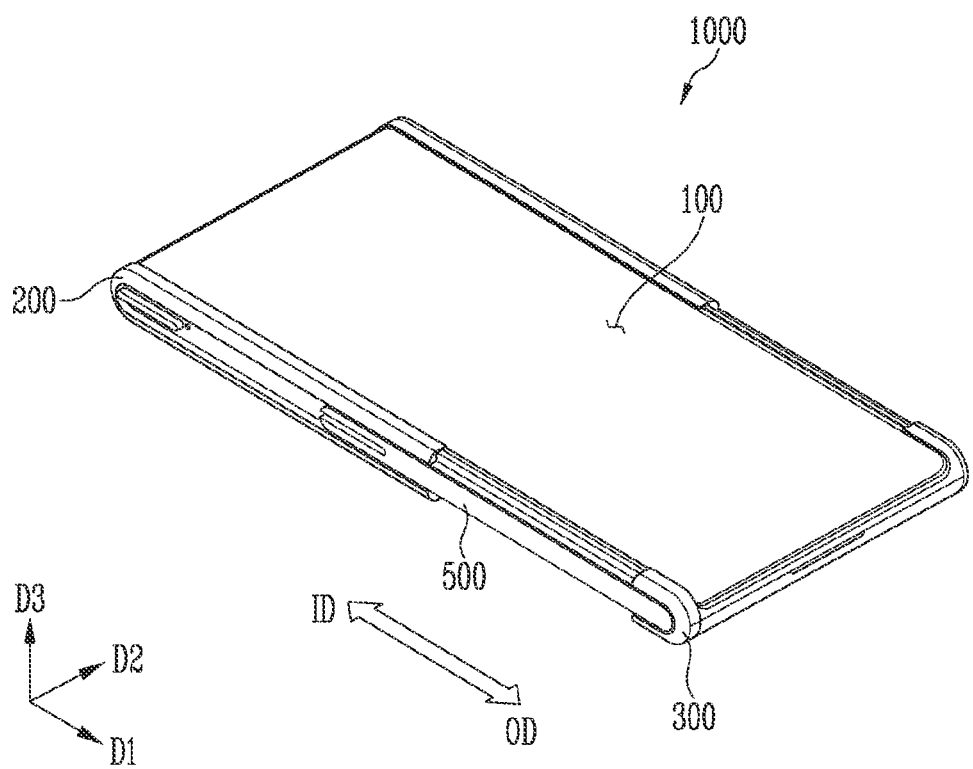
FIG. 1 is a perspective view of an embodiment of a display device according to the invention.

In the accompanying drawings, the dimensions of the structures are shown to be exaggerated for clarity of the invention. Although the terms first, second, etc. may be used herein to describe various elements, these elements should not be limited by these terms. These terms are merely used to distinguish one element from another element. Without departing from the scope of the invention, a first element described below may be referred to as a second element, and similarly, a second element may also be referred to as a first element, for example. The singular expressions are intended to include the plural expressions unless the context clearly indicates otherwise.

It will be understood that the terms "comprise", "include", "have", etc. used in the disclosure, specify the presence of stated features, integers, steps, operations, elements, components, and/or combinations of them but do not preclude the presence or addition of one or more other features, integers, steps, operations, elements, components, and/or combinations thereof.

Furthermore, when a first part is "connected" to a second part, this may include a case where the first part is directly connected to the second part as well as a case where a third part is connected between them.

Also, when a first part such as a layer, a film, a region, a plate, etc., is disposed "on" a second part, this may include not only a case in which the second part is disposed "directly on" the first part, but also a case in which a third part is interposed between them.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein. Term such as "unit" and "module" may mean a hardware component such as a circuit, for example.

Hereinafter, preferred embodiments of the invention will be described in more detail with reference to the accompanying drawings. The same reference numerals are used for the same elements in the drawings, and duplicate descriptions of the same elements are omitted.

Figure 2:
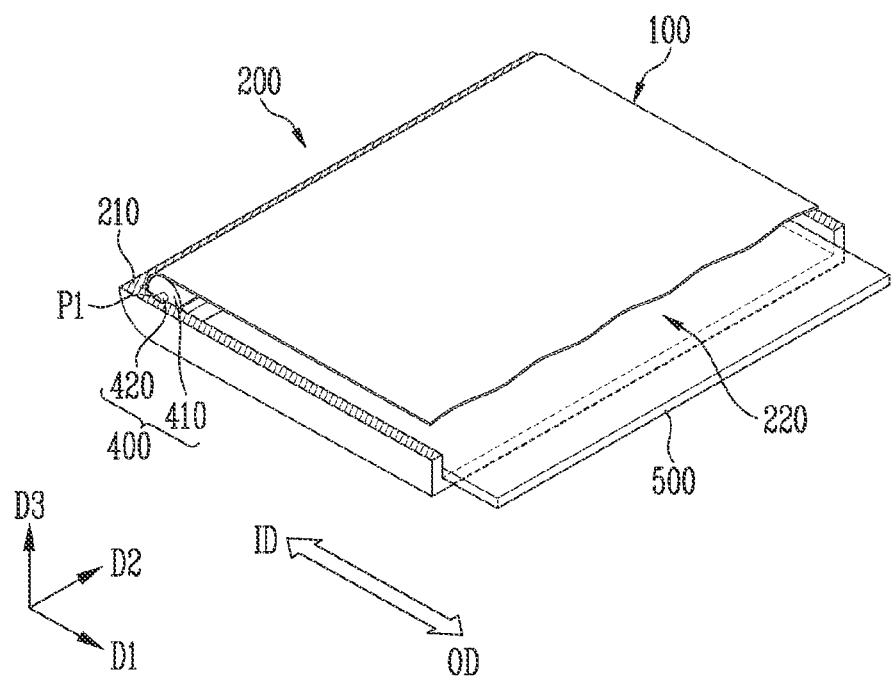
FIG. 2 is a conceptual diagram for explaining the interior of a storage shown in FIG. 1.
Figure 3A:
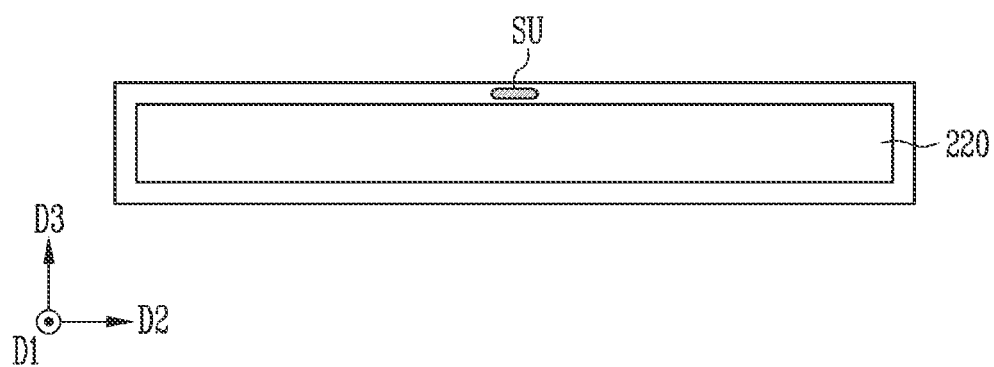
FIGS. 3A and 3B are cross-sectional views illustrating embodiments of shapes of openings according to the invention.
Figure 3B:
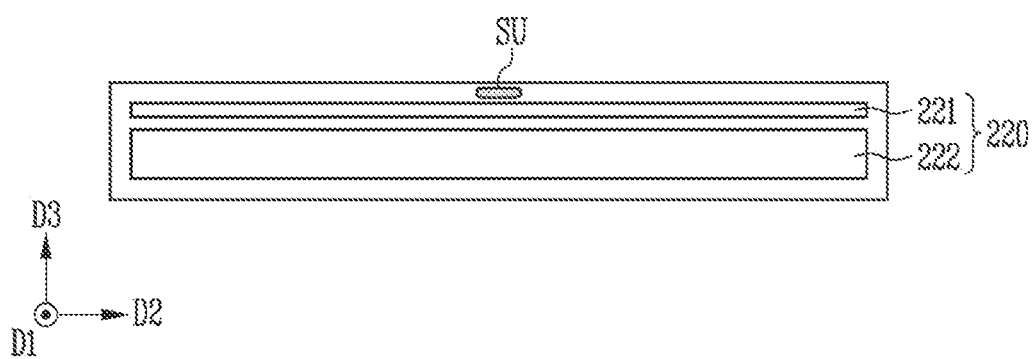

FIG. 1 is a perspective view of an embodiment of a display device according to the invention. FIG. 2 is a conceptual diagram for explaining the interior of a storage shown in FIG. 1. FIGS. 3A and 3B are cross-sectional views illustrating embodiments of shapes of openings according to the invention.

Referring to FIGS. 1 to 3B, a display device 1000 in an embodiment of the invention may include a display panel 100, a storage 200, an extension part 300, a roller 400, and a supporter 500.

In an embodiment, the display panel 100 may have a quadrangular (e.g., rectangular) shape. The display panel 100 may have flexibility and may be in a rolled state or an unfolded state. That is, the display panel 100 may be a flexible display panel.

In a first direction D1, one side of the display panel 100 may be coupled to the storage 200, and an opposite side of the display panel 100 may be coupled to the extension part 300.

In FIG. 1, a direction in which a screen of the display panel 100 is expanded, that is, a direction in which the screen is withdrawn may be defined as an output direction OD, and a direction in which the screen of the display panel 100 is reduced, that is, a direction in which the screen is inserted may be defined as an input direction ID. As the display panel 100 moves in the output direction OD, a portion of the display panel 100 that has been accommodated and covered in the storage 200 may be exposed to outside. As the display panel 100 moves in the output direction OD, a screen size of the display panel 100 exposed to the outside increases, so that a user may view an enlarged image than before.

As shown in FIG. 2, in the display device 1000, the display panel 100 accommodated in the storage 200 may be exposed to the outside of the storage 200 by rotating a rotating barrel 410 of the roller 400 clockwise. Accordingly, the screen of the display panel 100 may be expanded in the output direction OD. Conversely, in the display device 1000, the display panel 100 exposed to the outside of the storage 200 may be accommodated in the storage 200 by rotating the rotating barrel 410 of the roller 400 counterclockwise. Accordingly, the screen of the display panel 100 may be reduced in the input direction ID.

In the display device 1000 in an embodiment, the roller 400 may be operated by a motor (not shown). In this case, the display device 1000 may receive a predetermined motor control signal from a host AP (refer to FIG. 4), which will be described later, to operate the motor in a clockwise or counterclockwise direction. However, a method of increasing or decreasing the screen size of the display panel 100 is not limited thereto. In an embodiment, the roller 400 may be manually rotated by the user in the display device 1000, for example.

In the display device 1000, a degree to which the display panel 100 is unfolded may be calculated by a sensor SU (refer to FIGS. 3A and 3B) capable of measuring a distance between the storage 200 and the extension part 300. In an embodiment, the sensors SU (refer to FIGS. 3A and 3B) may be configured as a proximity sensor, for example.

The display panel 100 may include an image display unit and a substrate. The image display unit may be disposed on the substrate. The substrate may include a transparent material and may be a flexible substrate. In an embodiment, the substrate may include polyimide. The image display unit may display an image by emitting or controlling light. The image display unit may include various types of display elements employable in a flexible display device.

The storage 200 may include the display panel 100, the roller 400, and the supporter 500.

The storage 200 may include a housing 210 and an opening 220 passing through the housing 210 may be defined in the storage 200. The opening 220 may be defined in a side of the storage 200 opposite to the extension part 300 in the first direction D1. The display panel 100 and the supporter 500 may be inserted into and withdrawn from the storage 200 through the opening 220. Referring to FIG. 3A, the opening 220 may have a rod shape extending in a second direction D2. A length of the opening 220 in the second direction D2 may be greater than or equal to a length of the display panel 100 and the supporter 500 in the second direction D2. Accordingly, the display panel 100 and the supporter 500 may be inserted into and withdrawn from the storage 200 through the opening 220. Referring to FIG. 3B, the opening 220 may include a first opening 221*a* and a second opening 222*a*. The display panel 100 may be inserted into and withdrawn from the storage 200 through the first opening 221*a*, and the supporter 500 may be inserted into and withdrawn from the storage 200 through the second opening 222*a*.

Referring back to FIGS. 1 and 2, a length of the extension part 300 in the second direction D2 may be greater than a length of the opening 220 in the second direction D2. Also, the length of the extension part 300 in a third direction D3 may be greater than a width of the opening 220 in the third direction D3. In this case, the third direction D3 may be defined as a direction crossing a plan defined by the first direction D1 and the second direction D2. Accordingly, when the display panel 100 is inserted into the storage 200, the extension part 300 may not be inserted into the storage 200 through the opening 220. That is, when the display panel 100 is inserted into the storage 200, a predetermined area of one side of the extension part 300 in the first direction D1 may contact a surface of the storage 200 in which the opening 220 is defined.

The roller 400 may include the rotating barrel 410 and a rotating shaft 420. The rotating barrel 410 may have a cylindrical shape extending in the second direction D2. The display panel 100 may be wound around an outer surface of the rotating barrel 410. That is, the rotating barrel 410 may be a winding core for winding the display panel 100.

The rotating shaft 420 may be disposed at a center of the rotating barrel 410.

Specifically, the rotating shaft 420 may pass through the rotating barrel 410 in the second direction D2. The rotating shaft 420 may extend in the second direction D2, and opposite ends of the rotating shaft 420 in the second direction D2 may be coupled to two inner surfaces of the storage 200.

In the second direction D2, the two inner surfaces of the storage 200 may include first intaglio P1 and a second intaglio (not shown), respectively. Specifically, a first intaglio P1 may be disposed on an inner surface corresponding to one side of the storage 200 in the second direction D2, and a second intaglio (not shown) may be disposed on an inner surface corresponding to an opposite side of the storage 200 in the second direction D2.

The opposite ends of the rotating shaft 420 may be disposed to correspond to the first intaglio P1 and the second intaglio (not shown). Specifically, one side of the rotating shaft 420 in the second direction D2 may be disposed in the first intaglio P1, and an opposite side of the rotating shaft 420 in the second direction D2 may be disposed in the second intaglio (not shown). Accordingly, the rotating barrel 410 may be rotated about the rotating shaft 420 fixed to the storage 200, and the display panel 100 may be wound.

Although not shown, in an embodiment, the rotating barrel 410 may include a circuit board, a flexible circuit board, and a display driving integrated circuit 610 (refer to FIG. 4) to be described later. The circuit board, the flexible circuit board, and the display driving integrated circuit 610 may be disposed on an inner circumferential surface of the rotating barrel 410. The host AP (refer to FIG. 4) may be disposed (e.g., mounted) on the circuit board. The display driving integrated circuit 610 may be disposed (e.g., mounted) on the flexible circuit board. The circuit board may be connected to the display panel 100 through the flexible circuit board. The host may output image data and a control signal. The output image data may be provided to the display driving integrated circuit 610. The display driving integrated circuit 610 may convert the provided image data into a data signal for driving the display panel 100 and provide the data signal to the display panel 100.

The supporter 500 may be accommodated in the storage 200. The supporter 500 may be withdrawn from or inserted into the storage 200 in correspondence with the display panel 100. In an embodiment, the supporter 500 may be operated by a motor (not shown). The motor of the roller 400 and the motor of the supporter 500 may be synchronized with each other. That is, the supporter 500 may be moved in the output direction OD to correspond to the speed at which the display panel 100 is unfolded, and conversely, the supporter 500 may be moved in the input direction ID to correspond to the speed at which the display panel 100 is wound. Accordingly, the display panel 100 may be prevented from being bent by an external force, and the screen size of the display panel 100 that may be visually recognized by the user may be adjusted in stages.

In the rollable display device 1000, when an image is output on the screen of the display panel 100 that is wound on the rotating barrel 410 of the roller 400 and is not exposed to the outside, a problem in which power consumption is wasted may occur. Hereinafter, a method of preventing an image from being output on the screen of the display panel 100 that is not visually recognized by the user in order to reduce the power consumption will be described in detail with reference to FIGS. 4 to 10C.

Figure 4:
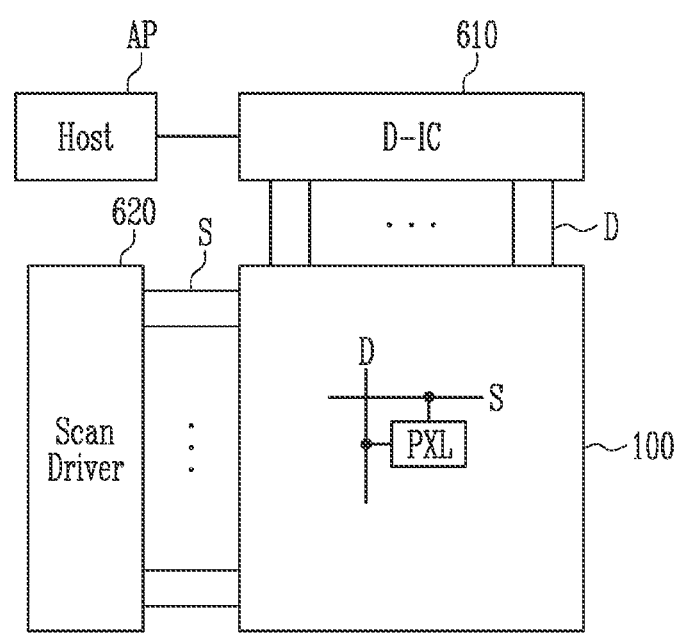
FIG. 4 is a diagram schematically illustrating an embodiment of a driver of the display device according to the invention.

FIG. 4 is a diagram schematically illustrating an embodiment of a driver of the display device according to the invention.

Referring to FIG. 4, the display device 1000 in an embodiment of the invention may include a display panel 100, a display driving integrated circuit 610, a scan driver 620, and a host AP.

The display panel 100 may include pixels PXL connected to data lines D and scan lines S. The pixels PXL may emit light of a predetermined luminance to outside in response to a data signal supplied through the data lines D. When a scan signal is supplied to a scan line S and a switching transistor is turned on, a pixel PXL in an embodiment may receive the data signal from a data line D. Thereafter, a driving transistor included in the pixel PXL may supply a current corresponding to the data signal to a light-emitting element, and accordingly, light having a predetermined luminance may be generated from the light-emitting element.

The display driving integrated circuit 610 may control overall driving of the display panel 100. In addition, a channel unit 614 (refer to FIG. 5) for outputting the data signal to the data lines D may be further included.

The scan driver 620 may supply the scan signal to the scan lines S. In an embodiment, the scan driver 620 may sequentially supply the scan signal to the scan lines S, for example. In this case, the pixels PXL may be selected in units of horizontal lines.

The scan driver 620 may be disposed (e.g., mounted) in the form of a chip in a peripheral area of the display panel 100. In an alternative embodiment, the scan driver 620 may be integrated in the peripheral area during a process of manufacturing the pixels PXL.

The host AP may generate and output a plurality of data signals (or image data), a plurality of clock signals (or control signals), or the like for driving the display driving integrated circuit 610. The host AP may be a system on chip ("SOC") or an application processor ("AP") chip in which various components are integrated into one chip.

Figure 5:
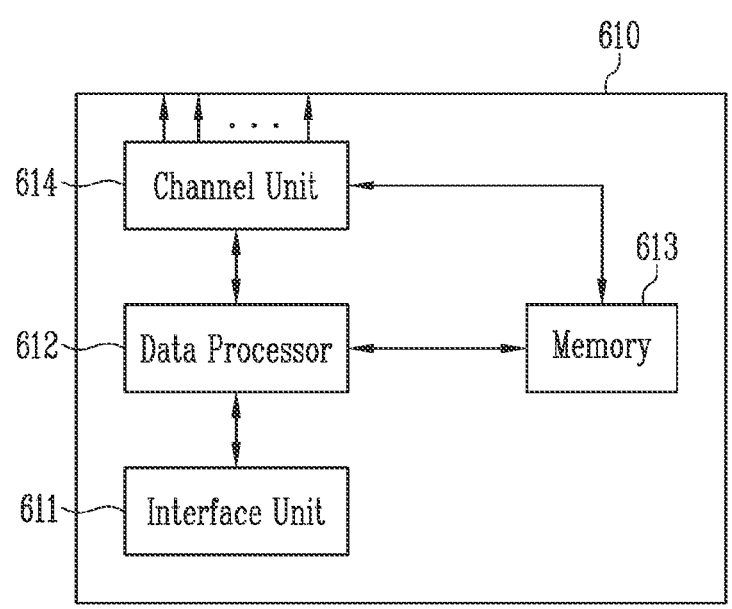
FIG. 5 is a diagram schematically illustrating a configuration of a display driving integrated circuit shown in FIG. 4.

FIG. 5 is a diagram schematically illustrating a configuration of a display driving integrated circuit shown in FIG. 4.

Referring to FIG. 5, the display driving integrated circuit 610 in an embodiment of the invention may include an interface unit 611, a data processor 612, a memory 613, and a channel unit 614.

The interface unit 611 may performs a function of communicating with the host AP through a predetermined interface, and may receive various signals from the host AP.

The data processor 612 may rearrange the image data supplied through the interface unit 611 to match the resolution of the display panel 100, and store the rearranged image data in the memory 613.

The memory 613 may store data. In an embodiment, the memory 613 may be set as random access memory ("RAM"), for example. In an embodiment, the memory 613 may include a lookup table LUT (refer to FIG. 9) including sizes of non-active areas corresponding to smart change signals to be described later.

In an embodiment, the data processor 612 may process data stored in the memory 613 in response to an image quality improvement algorithm, a command supplied through the interface unit 611, or the like. In an embodiment, the data processor 612 may process the data stored in the memory 613 into data in which a non-active area of the display panel 100 is set based on at least one smart size change signal and the lookup table to be described later, for example.

In this case, data provided to the pixels PXL (refer to FIG. 4) disposed in the non-active area of the display panel 100 may be data corresponding to a black grayscale. However, this is only one of embodiments, and a method of inactivating the pixels disposed in the non-active area is not limited thereto. In an embodiment, a known technique such as a method of masking a scan signal and a method of turning off some of a plurality of source amplifiers included in the channel unit 614 may be applied, for example.

The channel unit 614 may receive the data stored in the memory 613. The channel unit 614 receiving the data may generate the data signal (or data voltage) under the control of the data processor 612. In an embodiment, the channel unit 614 may select any one of a plurality of gamma voltages as the data signal in response to a data bit, for example. The data signal generated by the channel unit 614 may be supplied to the data lines D.

Although not shown in FIG. 5, the display driving integrated circuit 610 may further include a voltage unit generating a voltage desired for driving. In an embodiment, the voltage unit may generate a gate high voltage and a gate low voltage for driving the scan driver 620 and supply them to the scan driver 620, for example. Also, the voltage unit may generate an initialization voltage for initializing the pixel PXL and supply the initialization voltage to the display panel 100. In other words, the voltage unit may generate and supply various voltages desired to drive the display panel 100.

Figure 6:
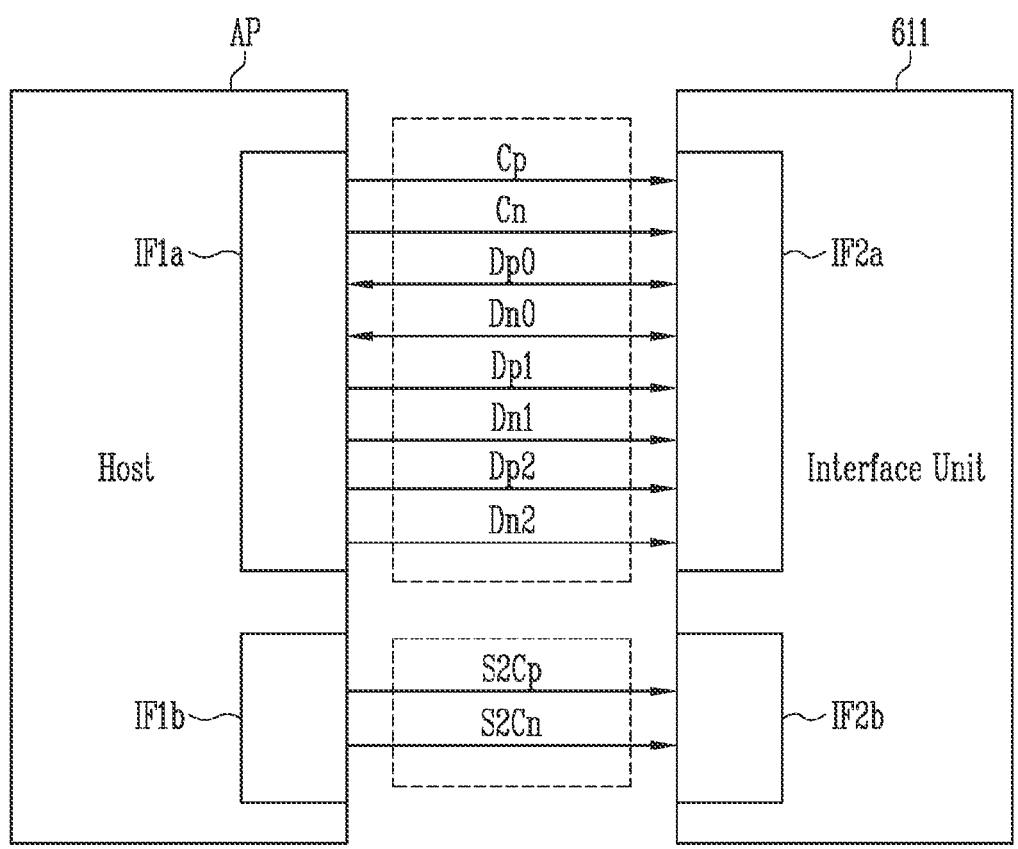
FIG. 6 is a diagram for explaining a communication method between a host and the display driving integrated circuit shown in FIG. 4.

FIG. 6 is a diagram for explaining a communication method between a host and the display driving integrated circuit shown in FIG. 4.

The host AP and the display driving integrated circuit 610 may communicate through a first interface and a second interface different from the first interface.

To this end, the host AP may include a first transmitting interface unit IF and a second transmitting interface unit IF1b.

Also, the interface unit 611 of the display driving integrated circuit 610 may include a first receiving interface unit IF2a and a second receiving interface unit IF2b.

Here, the first interface may be a mobile industry processor interface ("MIPI") method. That is, the first transmitting interface unit IF1a and the first receiving interface unit IF2a may communicate through the MIPI.

The first transmitting interface unit IF1a and the first receiving interface unit IF2a may include one clock lane module and at least one data lane module.

Each lane module may communicate via two interconnect lines Cp, Cn, Dpi, and Dni with a corresponding lane module on an opposite side of a lane interconnect. In an embodiment, a clock lane module may communicate via first interconnect lines Cp and Cn, for example. The first interconnect lines Cp and Cn may perform one-way communication from the first transmitting interface unit IF to the first receiving interface unit IF2a.

When three data lane modules are provided, as shown in FIG. 6, communication may be performed through three pairs of second interconnect lines Dp0, Dn0, Dp1, Dn1, Dp2, and Dn2.

One pair of second interconnect lines Dp0 and Dn0 among the three pairs of second interconnect lines Dp0, Dn0, Dp1, Dn1, Dp2, and Dn2 may perform bidirectional communication between the first transmitting interface unit IF1a and the first receiving interface unit IF2a, and the remaining second interconnect lines Dp1, Dn1, Dp2, and Dn2 may perform one-way communication from the first transmitting interface unit IF to the first receiving interface unit IF2a.

Here, the clock lane module and the data lane module provided in the first transmitting interface unit IF1a and the first receiving interface unit IF2a may conform to the MIPI standard.

Signals transmitted from the first transmitting interface unit IF1a to the first receiving interface unit IF2a may be data signals corresponding to an image to be displayed on the display panel 100 and a plurality of synchronization signals. Here, the data signals may be transmitted through the data lane module, and the synchronization signals may be transmitted through the clock lane module. In general, the data signals may be high-speed signals, and the synchronization signals may be low-power signals.

The second transmitting interface unit IF1b and the second receiving interface unit IF2b may communicate through the second interface.

To this end, the second transmitting interface unit IF1b and the second receiving interface unit IF2b may include a smart size change lane module.

The smart size change lane module included in the second transmitting interface unit IF1b and the smart size change lane module included in the second receiving interface unit IF2b may communicate through at least one of third interconnect lines S2Cp and S2Cn.

The third interconnect lines S2Cp and S2Cn may perform one-way communication from the second transmitting interface unit IF1b to the second receiving interface unit IF2b.

Signals transmitted from the second transmitting interface unit IF1b to the second receiving interface unit IF2b may be smart size change signals.

A smart size change signal may include a degree to which the display panel 100 is wound on the roller 400, that is, information on the winding amount of the display panel 100. As the winding amount of the display panel 100 increases, an exposed area of the display panel 100 may decrease and a non-exposed area may increase. In this case, an area in which the display panel 100 is accommodated in the storage 200 and is not visually recognized by the user may be defined as the non-exposed area (or a first area), and an area in which the display panel 100 is withdrawn to the outside of the storage 200 and is visually recognized by the user may be defined as the exposed area (or a second area).

As described above, when an image is output to the non-exposed area of the display panel 100, since the image is output to an area that the user cannot view, power consumption of the display device 1000 may be wasted. Accordingly, it is desired to set the exposed area of the display panel 100 as an active area for displaying an image, and set the non-exposed area of the display panel 100 as a non-active area for not displaying an image. Hereinafter, when explaining in terms of whether an image is output or not, the non-exposed area (or the first area) may be also referred to as the non-active area, and the exposed area (or the second area) may be also referred to as the active area.

A method of setting the non-active area using the smart size change signal will be described later in detail with reference to FIGS. 8 to 10C.

Figure 7:
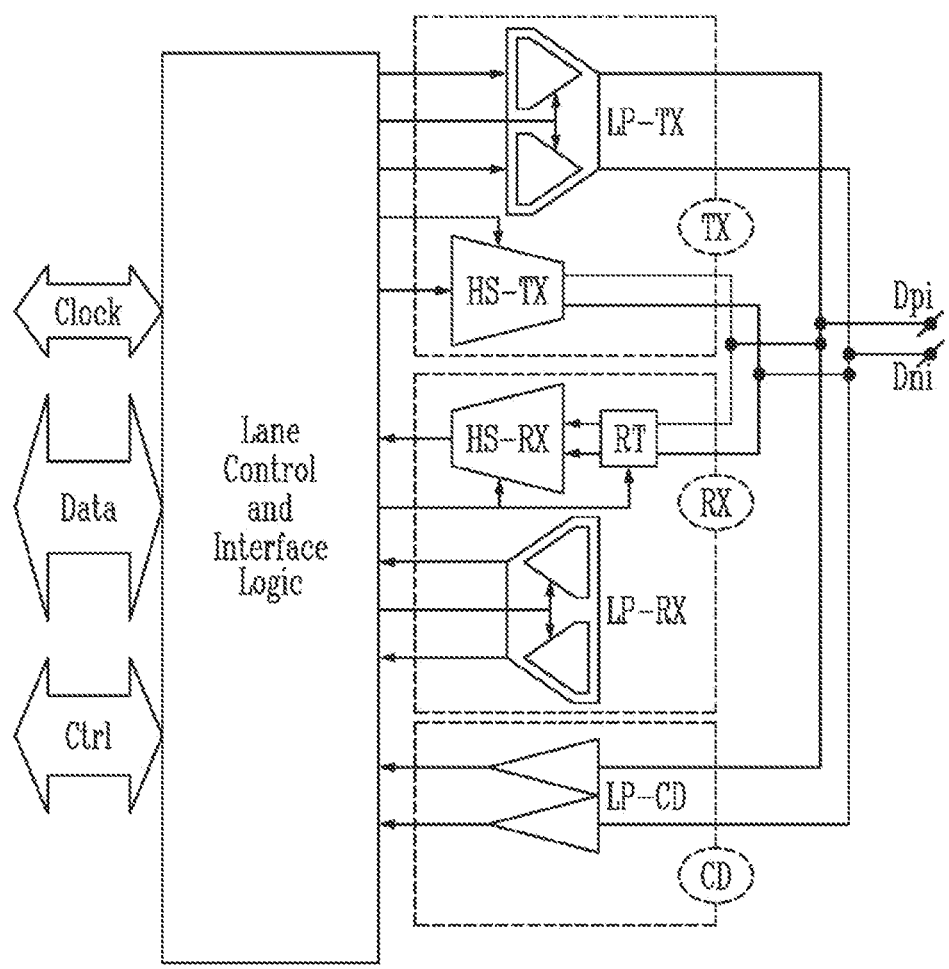
FIG. 7 is a diagram illustrating functions of a general-purpose lane module of MIPI.

FIG. 7 is a diagram illustrating functions of a general-purpose lane module of MIPI. FIG. 7 shows a configuration of one lane module having all overall functions.

Referring to FIG. 7, one lane module may include a control-interface logic (lane control and interface logic) and input/output units TX, RX, and CD.

The input/output units TX, RX, and CD may include a high-speed transmitter HS-TX, a high-speed receiver HS-RX, a low-power transmitter LP-TX, a low-power receiver LP-RX, and a low-power contention detector LP-CD.

In addition, a transmitter TX of the input/output units TX, RX, and CD may include the low-power transmitter LP-TX and the high-speed transmitter HS-TX. A receiver RX of the input/output units TX, RX, and CD may include the high-speed receiver HS-RX, the low-power receiver LP-RX, and a termination resistor (or termination impedance RT). The input/output units TX, RX, and CD may include the low-power contention detector LP-CD. The termination resistor RT may be enabled only when each lane module is in high-speed (HS) receive mode.

In an embodiment, high speed signals may have a low voltage swing of, e.g., about 200 millivolts (mV), while low power signals may have a high voltage swing of, e.g., about 1.2 volts (V).

The high-speed transmitter HS-TX and the high-speed receiver HS-RX may be mainly used for high-speed data transmission, and the low-power transmitter LP-TX, the low-power receiver LP-RX, and the low-power contention detector LP-CD may be mainly used for control, but may be selectively used in other cases as well.

One lane module may include only one of the high-speed transmitter HS-TX and the high-speed receiver HS-RX or both. However, the high-speed transmitter HS-TX and the high-speed receiver HS-RX included in one lane module may not be enabled at the same time.

When the lane module includes the high-speed transmitter HS-TX, the low-power transmitter LP-TX may also be included. Similarly, when the lane module includes the high-speed receiver HS-RX, the low-power receiver LP-RX may also be included. The low-power contention detector LP-CD may only be desired for bidirectional operation. The low-power contention detector LP-CD may be enabled to detect a collision only when the low-power transmitter LP-TX drives low power states.

These input/output functions may be controlled by the control-interface logic. The control-interface logic may interface with a protocol layer and determine a global operation of the lane module.

Figure 8:
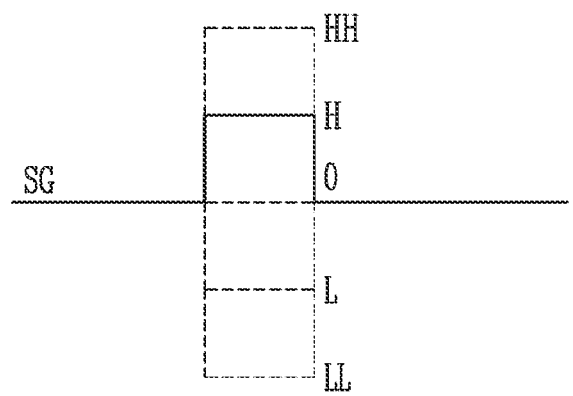
FIG. 8 is a waveform diagram for explaining a smart size change signal.
Figure 10B:
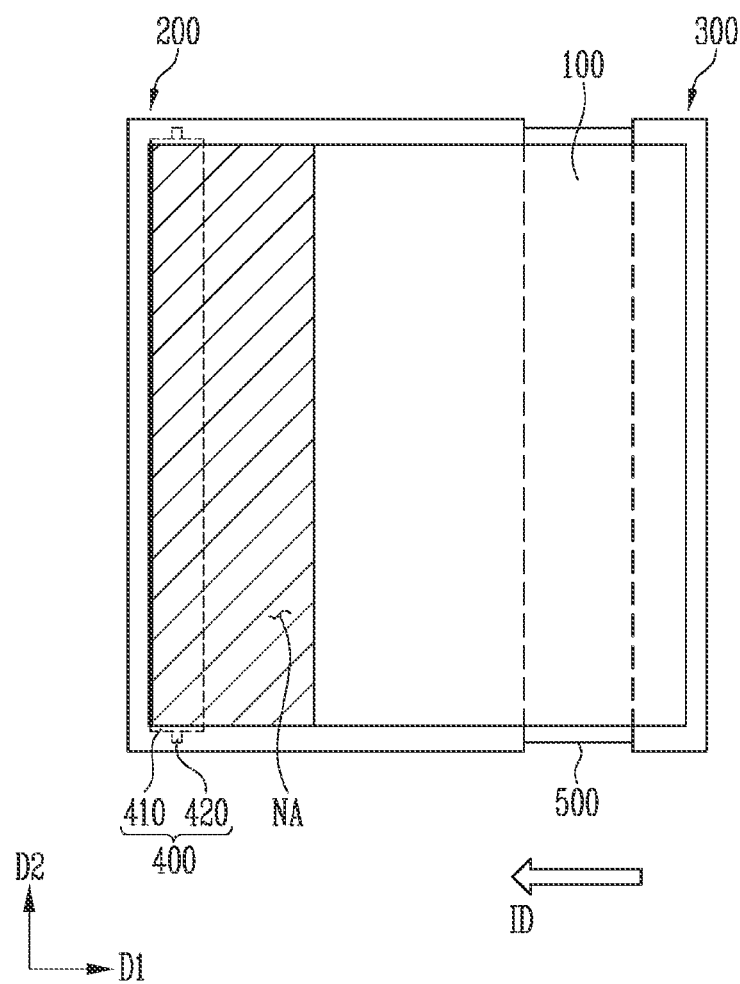

FIG. 8 is a waveform diagram for explaining a smart size change signal. FIG. 9 is a lookup table including sizes of non-active areas corresponding to smart change signals transmitted to each of third interconnect lines. FIGS. 10A to 10C are plan views illustrating a process of changing a screen size of a display panel from a maximum screen size to a minimum screen size.

Referring to FIG. 8, a smart size change signal SG may be a pulse waveform including a predetermined number of levels. In an embodiment, the smart size change signal SG may include an HH level, an H level, a 0 level, an L level, and an LL level. The smart size change signal SG may have a higher voltage level in the order of the LL level, the L level, the 0 level, the H level, and the HH level. In this case, the 0 level may be a reference voltage level (e.g., 0 [V]), the H level and the HH level may be positive voltage levels, and the L level and the LL level may be negative voltage levels.

In an embodiment, the display driving integrated circuit 610 (or the data processor 612) may determine a size of the non-active area of the display panel 100 through a combination of levels of the smart size change signal SG transmitted to each of the third interconnect lines S2Cp and S2Cn. As shown in FIG. 8, when the smart size change signal SG may express five levels (e.g., the HH level, the H level, the 0 level, the L level, and the LL level), and at least one of the third interconnect lines S2Cp and S2Cn includes two lines, since five levels may be transmitted through each of the third interconnect lines S2Cp and S2Cn, the size of the non-active area may be set to 25 steps according to the number of cases. However, the number of levels that may be expressed by the smart size change signal and the number of third interconnect lines S2Cp and S2Cn are only one of embodiments and the invention is not limited thereto. In an embodiment, in order to adjust the size of the non-active area of the display panel 100 at a finer interval, the number of levels included in the smart size change signal may be increased, and the number of interconnect lines may also be increased, for example.

Referring to FIGS. 6, 8, and 9, the third interconnect lines S2Cp and S2Cn may include an a-th connection line S2Cp and a b-th connection line S2Cn. The size of the non-active area of the display panel 100 (refer to FIG. 1) may be determined according to a level of the smart size change signal SG transmitted through the a-th connection line S2Cp and a level of the smart size change signal SG transmitted through the b-th connection line S2Cn.

In the lookup table LUT in an embodiment, when the level of the smart size change signal SG transmitted to the a-th connection line S2Cp is level 0, the level of the smart size change signal SG transmitted to the b-th connection line S2Cn may be the 0 level, the H level, the HH level, the L level and the LL level. In each case, the size of the non-active area of the display panel 100 may correspond to 0 pixels, 100 pixels, 200 pixels, 300 pixels, and 400 pixels. In this case, when both the level of the smart size change signal SG transmitted to the a-th connection line S2Cp and the level of the smart size change signal SG transmitted to the b-th connection line S2Cn are the 0 level, the non-active area of the display panel 100 may be 0 pixels. That is, as shown in FIG. 10A, this case may correspond to a case in which the screen size of the display panel 100 is full (or maximum).

In FIG. 10A, the hatched area may indicate an area in which the display panel 100 may be accommodated in the storage 200 by maximally moving in the input direction ID, that is, a maximum non-active area NA. In an embodiment, referring to the lookup table LUT of FIG. 9, the maximum non-active area NA may include 2400 pixels, for example.

In addition, when the level of the smart size change signal SG transmitted to the a-th connection line S2Cp is the 0 level, it has been described that the non-active area increases in units of 100 pixels as the level of the smart size change signal SG transmitted to the b-th connection line S2Cn goes toward the H level, the HH level, the L level, and the LL level. However, this is only one of embodiments, and even when the distance that the display panel 100 moves in the input direction ID (refer to FIG. 1) is the same, the size of the non-active area may be increased or decreased according to the number of pixels included in at least one pixel column of the display panel 100.

In addition, when the level of the smart size change signal SG transmitted to the a-th connection line S2Cp is the H level, the level of the smart size change signal SG transmitted to the b-th connection line S2Cn may be the 0 level, the H level, the HH level, the L level, and the LL level. In each case, the size of the non-active area of the display panel 100 may correspond to 500 pixels, 600 pixels, 700 pixels, 800 pixels, and 900 pixels.

In addition, when the level of the smart size change signal SG transmitted to the a-th connection line S2Cp is the HH level, the level of the smart size change signal SG transmitted to the b-th connection line S2Cn may be the 0 level, the H level, the HH level, the L level, and the LL level. In each case, the size of the non-active area of the display panel 100 may correspond to 1000 pixels, 1100 pixels, 1200 pixels, 1300 pixels, and 1400 pixels. In this case, when both the level of the smart size change signal SG transmitted to the a-th connection line S2Cp and the level of the smart size change signal SG transmitted to the b-th connection line S2Cn are the HH level, the size of the non-active area NA of the display panel 100 may be 1200 pixels. Referring to FIG. 10B, a half of the maximum non-active area NA may be wound around the rotating barrel 410, and the other half may correspond to the hatched area.

In addition, when the level of the smart size change signal SG transmitted to the a-th connection line S2Cp is the L level, the level of the smart size change signal SG transmitted to the b-th connection line S2Cn may be the 0 level, the H level, the HH level, the L level, and the LL level. In each case, the size of the non-active area of the display panel 100 may correspond to 1500 pixels, 1600 pixels, 1700 pixels, 1800 pixels, and 1900 pixels.

Similarly, when the level of the smart size change signal SG transmitted to the a-th connection line S2Cp is the LL level, the level of the smart size change signal SG transmitted to the b-th connection line S2Cn may be the 0 level, the H level, the HH level, the L level, and the LL level. In each case, the size of the non-active area of the display panel 100 may correspond to 2000 pixels, 2100 pixels, 2200 pixels, 2300 pixels, and 2400 pixels. Referring to FIG. 10C, all of the maximum non-active area NA may be wound around the rotating barrel 410.

As described above, the display driving integrated circuit 610 (FIG. 1) in the embodiment of the invention may receive the smart size change signal SG from the host AP through the interface unit separate from an interface unit of the MIPI method, and may quickly deactivate the non-exposed area of the display panel 100 that is not visually recognized by the user based on this. Accordingly, power consumption may be reduced.

The display device in the embodiments of the invention may provide the smart size change signal through the interface unit separate from an interface unit of the MIPI method to quickly deactivate a portion of the display panel that is not visually recognized by the user. Accordingly, power consumption may be reduced.

However, effects of the invention are not limited to the above-described effects, and may be variously extended without departing from the spirit and scope of the invention.

As described above, preferred embodiments of the invention have been described with reference to the drawings. However, those skilled in the art will appreciate that various modifications and changes may be made to the invention without departing from the spirit and scope of the invention as set forth in the appended claims.

What is claimed is:

1. A display device comprising:
   a display panel having flexibility;
   a storage connected to a first end of the display panel and accommodating the display panel so that the display panel is inserted and withdrawn;
   an extension part connected to a second end of the display panel opposite to the first end of the display panel, the extension part facing a side of the storage in a first direction; and
   a display driving integrated circuit which receives image data and a control signal from a host and provides a data signal to the display panel, the display driving integrated circuit including:
   a data processor which receives a plurality of smart size change signals from the host and sets a non-active area of the display panel based on the smart size change signals,
   wherein the display driving integrated circuit receives the image data and the control signal from the host through a first interface,
   wherein the display driving integrated circuit receives the smart size change signals through a second interface different from the first interface, and
   wherein the second interface includes a plurality of connection lines respectively transmitting the smart size change signals so that a size of the non-active area is determined through a combination of respective levels of the smart size change signals.

2. The display device of claim 1, wherein thea size of the non-active area increases in proportion to a degree to which the display panel is inserted into the storage.

3. The display device of claim 1, wherein the first interface is a mobile industry processor interface method.

4. The display device of claim 1, wherein at least one of the smart size change signals is a pulse waveform including a plurality of levels.

5. The display device of claim 4, wherein the at least one of the smart size change signals includes a 0 level, an H level, an HH level, an L level, and an LL level, and the at least one of the smart size change signals has a higher voltage level in an order of the LL level, the L level, the 0 level, the H level, and the HH level.

6. The display device of claim 1, wherein the display driving integrated circuit includes a memory in which a lookup table including a-the size of the non-active area corresponding to the smart size change signals is stored.

7. The display device of claim 1, wherein the display driving integrated circuit includes a channel unit which provides the data signal corresponding to a black grayscale to pixels disposed in the non-active area.

8. The display device of claim 1, wherein the storage and the extension part extend in a second direction intersecting the first direction.

9. The display device of claim 8, wherein the storage further includes a roller on which the display panel is wound in a predetermined rotation direction, and wherein the roller includes:

a rotating barrel having a cylindrical shape extending in the second direction and including the display panel wound around an outer surface thereof; and a rotating shaft extending through the rotating barrel in the second direction and including opposite ends fixed to an inner surface of the storage in the second direction, wherein the rotating barrel rotates in the predetermined rotation direction about the rotating shaft.

10. The display device of claim 9, wherein the smart size change signals include information on a winding amount related to a degree to which the display panel is wound on the roller.

11. The display device of claim 10, wherein the non-active area increases as the winding amount increases.

12. A display device comprising:

a host which transmits image data and a control signal through a first interface and transmits a plurality of smart size change signals through a second interface different from the first interface;

a display driving integrated circuit including a first interface unit which receives the image data and the control signal through the first interface, and a second interface unit which receives the smart size change signals through the second interface; and a display panel which receives the image data, the control signal, and a data signal corresponding to the smart size change signals from the display driving integrated circuit to display an image, wherein the display driving integrated circuit includes a data processor setting a non-active area of the display panel based on the smart size change signals, and wherein the second interface includes a plurality of connection lines respectively transmitting the smart size change signals so that a size of the non-active area is determined through a combination of respective levels of the smart size change signals.

13. The display device of claim 12, wherein the first interface is a mobile industry processor interface method.

14. The display device of claim 13, wherein at least one of the smart size change signals is a pulse waveform including a plurality of levels.

15. The display device of claim 14, wherein the display driving integrated circuit includes a memory in which a lookup table including the size of the non-active area corresponding to the smart size change signals is stored.

16. The display device of claim 15, wherein the display driving integrated circuit includes a channel unit which provides the data signal corresponding to a black grayscale to pixels disposed in the non-active area.

* * * * *